United States Patent [19]

Alberts et al.

[11] 4,056,671

[45] Nov. 1, 1977

[54] STYRENE ACRYLONITRILE COPOLYMERS WITH HIGH DIMENSIONAL STABILITY UNDER HEAT

[75] Inventors: Heinrich Alberts, Cologne; Herbert Bartl, Odenthal-Hahnenberg; Richard Prinz, Leverkusen, all of Germany

[73] Assignee: Bayer Aktiengesellschaft, Germany

[21] Appl. No.: 574,950

[22] Filed: May 6, 1975

Related U.S. Application Data

[63] Continuation-in-part of Ser. No. 530,169, Dec. 6, 1974, abandoned.

[30] Foreign Application Priority Data

Dec. 12, 1973 Germany .............................. 2361743

[51] Int. Cl.² .................. C08F 210/00; C08F 212/00
[52] U.S. Cl. .................................... 526/342; 526/218; 526/227; 526/347; 526/348; 526/350; 526/916
[58] Field of Search ............... 260/80.78; 526/342, 526/347, 348, 350, 916

[56] References Cited

U.S. PATENT DOCUMENTS

| | | | |
|---|---|---|---|
| 2,102,179 | 12/1937 | Hopff | 260/2 |
| 2,140,048 | 12/1938 | Fikentscher | 260/2 |
| 2,439,202 | 4/1948 | Daly | 260/45.5 |
| 2,559,155 | 7/1961 | Chapin | 260/85.5 |
| 2,833,746 | 5/1958 | Haefner | 260/80.5 |
| 3,451,538 | 6/1969 | Trementozzi | 206/46 |
| 3,738,972 | 6/1973 | Moriyama | 260/85.5 R |
| 3,772,257 | 11/1973 | Bochum | 260/85.5 R |

*Primary Examiner*—Joseph L. Schofer
*Assistant Examiner*—A. L. Clingman
*Attorney, Agent, or Firm*—Connolly and Hutz

[57] ABSTRACT

Copolymers with improved dimensional stability under heat consisting essentially of (meth)acrylonitrile, styrene and at least one aliphatic monoolefin with 2 to 8 carbon atoms.

3 Claims, No Drawings

STYRENE ACRYLONITRILE COPOLYMERS WITH HIGH DIMENSIONAL STABILITY UNDER HEAT

CROSS-REFERENCE TO RELATED APPLICATION

This is a continuation in part application of my application Ser. No. 530,169, filed Dec. 6, 1974 and now abandoned.

This invention relates to thermoplastic moulding compounds with high dimensional stability under heat and soft flow which are produced by the copolymerisation of styrene and acrylonitrile in the presence of aliphatic monoolefins.

It has long been known that styrene-acrylonitrile copolymers have a better dimensional stability under heat than polystyrene (see US-Pat. No. 2,102,179). Several patents describe the synthesis of the copolymers (see US-Pat. Nos. 2,140,048; 2,439,202 and German patent specifications 961,309; 1,003,446), and improvements in the methods for achieving special product qualities (see US-Pat. No. 3,772,257 = German Offenlegungsschrift No. 2,057,250 and US-Pat. No. 3,738,972 = German Offenlegungsschrift No. 2,142,617). According to US Pat. No. 2,439,202, the softening points of the copolymers rise with increasing acrylonitrile content from about 90° C to 108° C. According to German Pat. Nos. 961,309 and 1,003,446, styrene acrylonitrile copolymers are prepared in an alcoholic suspension which have an acrylonitrile content of 28.5% and a softening point of 102° C when the K-value (see H. Fikentscher, Cellulosechemie 13 (1932)) is 76, or an acrylonitrile content of 19.7% and softening point of 103° C when the K-value is 84.

But styrene-acrylonitrile (SAN) copolymers which would have a high dimensional stability under heat and very soft flow when worked up thermoplastically without any loss in the mechanical strength properties (e.g. flexural strength) of the polymers have not yet been known. Surprisingly these polymers were obtained by using aliphatic monoolefins as molecular weight regulators in the polymerisation of styrene-acrylonitrile mixtures.

This invention therefore relates to a process for the production of copolymers of styrene and (meth)acrylonitrile with improved dimensional stability under heat in the presence of a radical forming agent in a homogeneous or heterogeneous phase, wherein the mixtures of (meth)acrylonitrile and styrene are polymerised in the presence of at least one aliphatic monoolefin, preferably containing 2 to 18 carbon atoms.

This invention also relates to copolymers containing
a. 5 – 85% by weight, preferably 10 – 40% by weight of (meth)acrylonitrile.
b. 14.99 – 94.5% by weight, preferably 89.99 – 59.5% by weight of styrene and
c. 0.01 – 0.5% by weight of an aliphatic monoolefin, the sum of $a + b + c$ being 100%.

The polymers produced by the process according to the invention have intrinsic viscosities of 0.5 to 10 (dl/g) [determined from a solution in dimethylformamide at 25° C]. The molecular weights determined by the method of light scattering are between 40,000 and 5,000,000. The non-uniformity U defined by (Mw/Mn) − 1, preferably lies in the range of 0.2 to 5, more preferably 1.5 to 3.5. The polymers have a random structure. The melt index values according to DIN 53 735 are between 20 and 280 [g/10 min] at 240° C under a load of 10 kp.

Aliphatic monoolefins have important advantages over the mercaptans such as dodecylmercaptan (see DOS No. 2,057,520) or alkylmercaptan mixtures (see DOS No. 1,802,089) which are generally used as molecular weight regulators. For example, the low boiling aliphatic olefins can easily be removed from the reaction mixtures without producing any odour which is always a problem when working with mercaptans. Since monoolefins have a much lower tendency to transfer reactions than the sulphur derivatives, they can be used in much smaller quantities than mercaptans under identical conditions. A single dose of monoolefin at the beginning of the reaction is sufficient to ensure a consistent regulating action and a considerably increase of the molecular uniformity of the copolymers. It is surprisingly found that the addition of the monoolefins considerably improves not only the flow but also the dimensional stability under heat compared with these properties in polymers which have not been regulated.

The aliphatic monoolefins with 2 – 18 and more preferably 2 – 4 carbon atoms which may be used as molecular weight regulators include ethylene, propylene, butene-1, butene-2, isobutylene, straight chain or branched pentenes, hexanes, octenes. Propylene and isobutylene are preferred.

Per compounds or azo compounds which split into radicals may be used as polymerisation catalysts, for example aliphatic azo dicarboxylic acid derivatives such as azobisisobutyric acid nitrile, azodicarbonamide or azodicarboxylic acid esters, peroxides such as lauroyl peroxide, succinyl peroxide, dibenzoyl peroxide, p-chlorobenzoyl peroxide, 2,4-dichlorobenzoyl peroxide, ketone peroxides such as methyl ethyl ketone peroxide; methyl isobutyl ketone peroxide; cyclohexanone peroxide; acetylacetone peroxide; alkyl esters of per acids such as tert.-butyl perpivalate; tert.-butylperoctoate; tert.-butyl perbenzoate; tert.-butylperisononanate; monotertiary butyl permaleate or tert.-butalperacetate; percarbonates such as dicyclohexylpercarbonate; dialkylperoxides such as di-tert.-butylperoxide; dicumylperoxide; hydroperoxides such as cumene hydroperoxide; tert.-butylhydroperoxide; peracids such as isophthalic mono-peracid or special peroxides such as acetal cyclohexane sulphonyl peroxide.

Peroxides and radical starters produced in situ may of course also be used. Suitable reactions for this purpose are, for example, the reaction of phosgene, chloroformic acid esters, acid halides, isocyanates or diisocyanates with hydrogen peroxide or hydroperoxides. Pinacols or hydroperoxidised polymer substrates may also be used. Radicals produced by photo reactions of the kind which occur on irradiation with UV light or $\alpha$, $\beta$, $\gamma$ and X rays with and without sensitizers, if desired in the presence of peroxides, may also be employed. Suitable water-soluble initiators include hydrogen peroxide and the alkali metal and alkaline earth metal salts of per acids and peroxo acids. Ammonium and potassium peroxydisulphate are preferred.

Polymerisation may, of course, be started with the aid of redox systems. In this case, combinations of hydrogen peroxide with reducing agents such as ascorbic acid and heavy metal salts such as iron or copper salts may be particularly recommended in addition to combinations such as potassium or ammonium peroxydisulphate and alkali metal pyrosulphite at pH 4 to 6. The initiating system may be widely varied to produce special effects, sec Houben-Weyl, Methoden der Oranischen Chemie, Volume XIV/2, in which initiators and redox systems are described. The concentration of initiator is from 0.001 and to 10% by weight, based on the monomers, preferably 0.05 to 0.4% by weight.

Polymerisation is carried out at a temperature between −40° C and 250° C depending on the selected initiator system and preferably in the range of 40° C to 150° C and at pressures which may be above 100 bar but are preferably between normal pressure and 25 bar.

The copolymers according to the invention may be prepared by polymerisation in organic solution or suspension, by emulsion or suspension polymerisation in an aqueous phase or by solvent-free polymerisation (for example in an extruder).

If the process according to the invention is carried out in aqueous suspension it is necessary to use dispersing agents to obtain satisfactory bead polymers. The dispersing agents used may, for example, be polyvinyl alcohol, partly saponified polyvinyl acetates or cellulose or starch derivatives such as methylcellulose, ethylcellulose or ethyl hydroxycellulose. The following are examples of suitable synthetic dispersing agents (copolymers of hydrophilic and hydrophobic monomers): Styrene/acrylic acid; styrene/maleic anhydride; ethylene/acrylic acid; ethylene/maleic anhydride; acrylic acid ester/acrylic acid; (meth)-acrylic acid derivatives/(meth)acrylic acid copolymers; polyethylene oxides; ethylene/propylene oxide copolymers and polyesters with hydroxyl numbers between 10 and 250. If mixtures of dispersing agents and emulsifiers are used, it is preferred to select emulsifiers which are biologically degradable. Inorganic colloids or inorganic salts (for example phosphoric acid derivatives) may also be used.

This aqueous suspension polymerisation process may also be carried out as a reverse emulsion polymerisation or it may be started as a reverse emulsion polymerisation and completed as a suspension polymerisation of styrene and acrylonitrile in water.

A solution of the monomers and a radical forming agent (organic phase) is produced by this process. Water is subsequently added to the organic phase and a water-in-oil emulsion is produced, preferably with the aid of a water-in-oil emulsifier. The initiator or initiator system may also be present in the water. In the system which is to be polymerised, therefore, the dispersed phase originally comprises water which may contain all or part of the initiator or initiator system, portions of the monomers and the water-in-oil emulsifier, while the remaining monomers or all the monomers constitute the continuous phase. Copolymerisation may already set in at the stage of the preparation of the water-in-oil emulsion. After formation of the water-in-oil emulsion (first stage) an additional quantity of water and, optionally, dispersing agents for the water-in-oil emulsion are added with stirring (second stage), phase reversal gradually taking place at this stage. An oil-in-water dispersion is formed in which the water substantially forms the continuous phase and oil the dispersed phase. At the end of polymerisation, the oil droplets dispersed in water have completely solidified to porous beads which contain water.

The water-in-oil emulsifiers, which are preferably used in quantities of 0.05 to 10% by weight, more preferably 0.5 to 4% by weight, based on the monomers, may, for example, be graft products of styrene or other vinyl monomers on polyethers or ethlene oxide or styrene copolymers with α, β-unsaturated carboxylic acis or a 1:1 copolymer of methacrylic acid and methyl methacrylate. Other water-in-oil emulsifiers are also suitable, for example those described in British Patent Specifications No.928,621; 962,699; 959,131; 964,195 and 1,076,319; German Patent Specification No. 1,300,286 and 1,211,655 or in Belgian Patent Specification No. 785,091.

The proportion by weight of aqueous phase to organic phase should preferably be between 0.2:1 and 1:1 at the stage of preparation of the water-in-oil emulsion (first stage). These limits may be exceeded in either direction so long as a water-in-oil emulsion can be formed but the ratio of aqueous phase to organic phase should not be higher than 3:1. For preparing the water-in-oil emulsion it is always advisable to add the aqueous phase to the organic phase.

The aliphatic monoolefins may be added with the solution of monomers or at a later stage but at the latest before phase reversal takes place.

The polymerisation temperatures in the first stage are preferably 30° to 120° C, more preferably 60° to 85° C. Polymerisation is preferably continued to a conversion of 10 to 60%.

In the second stage, the proportion by weight of aqueous phase to oil phase is preferably between 1:1 and 3:1 and should not be higher than 10:1. Preparation of the water-in-oil emulsion may be carried out at temperatures of 10° C to 90° C. Addition of water and dispersing agent, if any, in the second stage is carried out after formation of the water-in-oil emulsion and heating or cooling to the polymerisation temperature of the second stage of 40° to 180° C, preferably 75° to 150° C.

Dispersing agents which have been found suitable are polyvinyl alcohol, partly saponified polyvinyl acetate, alkyl celluloses such as methyl cellulose, alkyl sulphonates or alkyl sulphates. They are preferably used in quantities of 0.01 to 3% by weight, more preferably 0.5 to 2% by weight, based on the quantity of monomers used.

A particular advantage of this process lies in the ease with which the porous bead polymer obtained can be processed and dried.

When the polymer is treated by thermoplastic processes the shaped products obtained have an exceptionally attractive surface gloss and are highly transparent with very little self coloration.

If the process according to the invention is carried out in one of the usual organic solvents, polymerisation is stated in a homogeneous phase consisting of the monomers, the selected initiator system, the solvent and the aliphatic monoolefin. If the solvent is one which does not dissolve the polymer formed, polymerisation is completed as a precipitation or suspension polymerisation. Suitable organic solvents include saturated aliphatic or aromatic hydrocarbons, substituted aromatic compounds such as toluene or chlorobenzene, halogenated aliphatic hydrocarbons such as methyl chloride, carbon tetrachloride, trichloroethylene, tetrachloroethylene or trichlorofluoromethane or other frigens, low boiling alcohols such as methanol, ethanol, propanol, isopropanol and the isomeric butanols, preferably tert.-butanol, as well as dimethylformamide and dimethylacetamide.

If the process according to the invention is carried out as an emulsion polymerisation, it is distinguished not only by the fact that the monomers and initiator solution containing emulsifier may be added simultaneously so that exceptionally high output rates can be achieved at the preferred temperature region of about 80° C and chemically very uniform products can be obtained, but also by an unexpected improvement in the molecular homogeneity which could not be achieved by an exact supply of the monomer alone. According to a preferred embodiment of the invention, polymerisation is carried out at 75° to 85° C. As already mentioned in US-Patent Specification No. 2,559,155, polymerisation at 80° C under reflux conditions can very easily be controlled at a constant temperature.

The emulsifiers used may be alkali metal salts of modified resinic acids, for example Dresinate ® 731, but alkyl sulphates and sulphonates containing 12 to 24 carbon atoms in the alkyl group may also be used. Biologically degradable emulsifiers are preferred. The emulsifiers are preferably used at a concentration of 0.5 to 20% by weight, more preferably 0.5 to 3% by weight, based on the aqueous phase. These emulsifiers may, of course, be combined with the above mentioned dispersing agents as desired.

The polymer may be isolated if desired by precipitation from the emulsion by known methods or, for example, by spray drying.

The process according to the invention may be carried out continuously or discontinuously. Copolymerisation may be carried out with or without solvents in polymerisation apparatus such as extruder screws, kneaders or special stirrer assemblies. Evaporation of the solvents from the polymerisation mixtures is carried out in evaporator screws, thin layer evaporators or spray driers. The polymerisation reaction mixtures may contain the usual auxiliary agents such as chain transferring agents for telomerisation reactions, molecular weight regulators if any are desired in addition to the aliphatic monoolefins, stabilizers, lubricants, antistatic agents and antioxidants.

Owing to their exceptionally uniform chemical structure and the fact that they have only a slight self coloration, the thermoplasts produced according to the invention can be dyed to exceptionally brilliant tones with the known dyes or pigments. The products according to the invention are generally obtained as powders or beads, depending on the method by which they have been produced. They are used for the production of shaped products of all kinds and are exceptionally suitable for the production of articles which will come into contact with boiling water. They are also exceptionally resistant to petroleum hydrocarbons and oil. Copolymers may also be used for the production of films, fibres or coatings. The products of the invention may be combined in various ways with fillers such as sawdust, chalk, powdered glass or glass fibres, for the production of novel high quality materials. Their solutions or emulsions may, of course, also be used as coatings. The products of the invention can also be used as thermoplastic adhesives.

In the following examples, % means percent by weight and parts means parts by weight.

EXAMPLE 1

111 g of styrene, 45 g of acrylonitrile, 2400 ml of water, 63 g of Dresinate ® 731 and 0.44 g of potassium peroxydisulphate are heated to 80° C and stirred in a 6 litre vessel while isobutylene is introduced, and stirring is continued for 30 minutes at 80° C. 10 ml of solution 1 and 80 ml of solution 2 are then added at intervals of 5 minutes.

Solution 1: 12 g of Dresinate ® 731 and 3.86 g of potassium peroxydisulphate made up to 200 ml with water
Solution 2: 999 g of styrene and 385 g of acrylonitrile.

Stirring is continued for 1 hour at 80° C after all the reactants have been added. A total of 50 g of isobutylene is passed through the reaction vessel. The latex has a solids content of 39%. The reaction mixture is precipitated and the polymer is isolated and dried. 1443 g of styrene/acrylonitrile copolymer are obtained. According to the nitrogen content of N = 7.0% found by analysis, the acrylonitrile content is calculated to be 26.5%. The intrinsic viscosity determined in dimethyl formamide at 25° C is $(\eta) = 1.06$, the K value according to Fikentscher is 69 and the dimensional stability under heat according to Vicat is 117° C (according to DIN 53460 at 5 kp loading).

EXAMPLE 2

111 g of styrene, 90 g of acrylonitrile, 2400 ml of water, 32 g of Dresinate® 731, 32g of sodium alkylsulphonate containing 12 to 14 carbon atoms in the alkyl group and 0.88 g of potassium peroxydisulphate are heated to 80° C and stirred while isobutylene is passed through. Stirring is then continued for 30 minutes at 80° C and 10 ml of solution 1 and 80 ml of solution 2 are added to the reaction mixture at intervals of 5 minutes.
Solution 1: 12 g of Dresinate® 731 and 4.2 g of potassium peroxydisulphate made up to 200 ml with water
Solution 2: 999 g of styrene and 340 g of acrylonitrile.

Stirring is continued for one hour at 80° C after all the reactants have been added. A total of 50 g of isobutylene is passed through the reaction mixture. The latex has a solids content of 37.3%. After isolation and treatment 1534 g of styrene/acrylonitrile copolymer are obtained. According to the nitrogen content of N = 7.55% found by nitrogen analysis, the acrylonitrile content is calculated to be 29.0%. The intrinsic viscosity determined in dimethylformamdie at 25° C is $(\eta) = 1.37$, the K-value according to Fikentscher 81 and the dimensional stability under heat according to Vicat 114° C.

EXAMPLE 3

1554 g of styrene, 511 g of acrylonitrile, 16,800 ml of water, 196 g of sodium alkylsulphonate containing 12 to 14 carbon atoms in the alkyl group, 0.7 of iron-II-ammonium sulphate, 1.9 ml of normal sulphuric acid, 0.35 g of sodium pyrosulphite and 1.2 g of ammonium peroxide sulphate are introduced into a 40 L stirrer autoclave. The autoclave is evacuated and flushed with nitrogen. 600 g of propylene are then forced in. The reaction mixture is heated to 60° C and stirred for 20 minutes at 60° C. Three solutions are then added in a continuous flow.
Solution 1: 42 g of sodium alkylsulphonate and 2.8 g of sodium pyrosulphite made up to 1015 ml with water
Solution 2: 16.8 g of ammonium peroxydisulphate made up to 980 ml with water.
Solution 3: 6216 g of styrene and 2058 g of acrylonitrile.
Length of time during which the solutions are pumped in:
Solution 1: 180 minutes
Solution 2: 165 minutes
Solution 3: 150 minutes.

Stirring is continued for one hour at 60° C after the addition of solution 1 has been completed. 6320 g of styrene/acrylonitrile copolymer are obtained when the reaction product is processed. According to the nitrogen content of N = 5.95 determined by analysis, the acrylonitrile content is calculated to be 22.6%. The intrinsic viscosity of the polymer in dimethylformamide at 25° C is (η) = 1.72, the K-value according to Fikentscher 89 and the dimensional stability under heat according to Vicat is 110° C.

EXAMPLE 4

6720 g of styrene, 2226 g of acrylonitrile, 24 g of tert.butylperipivalate, 850 ml of an 8% solution of dispersing agent (1:1 copolymer of methacrylic acid/-methyl methacrylate in aqueous solution adjusted to pH 6), 8500 ml of water and 2.8 g of sodium pyrosulphite are introduced into a 40 L stirrer autoclave. The autoclave is evacuated and flushed with nitrogen. 400 g of propylene are then introduced. The reaction mixture is heated to 80° C and a solution of 6.3 g of a sodium alkylsulphonate containing 12 to 14 carbon atoms in the alkyl group in 10,500 ml of water are then continuously pumped in for 4 hours at 80° C. The reaction mixture is then stirred for a further 2 hours at 80° C. Unreacted monomers remaining behind and volatile constituents are removed with steam. The bead polymer is washed and dried. 7710 g of a copolymer with an acrylonitrile content of 23.5%, a styrene content of about 76% and a propylene content below 0.5% are obtained. The intrinsic viscosity (η) determined in dimethylformamide at 25° C is 1.4 and the dimensional stability under heat according to Vicat is 111° to 112° C.

EXAMPLE 5

650 g of styrene, 170 g of acrylonitrile, 40 ml of a 10% solution of dispersing agent (1:1 copolymer of methacrylic acid and methylmethacrylate adjusted to pH 7), 1000 ml of water and 0.4 g of sodium pyrosulphite are heated to 80° C in a 6 L stirrer vessel and stirred while isobutylene is passed through. Stirring is continued for a further 15 minutes at 80° C and 2.2 g of a 75% tert.-butyl perpivalate solution in dibutylphalate diluted with 15 ml of cleaning petrol are then added. At the same time, addition of the following solution, which takes 100 minutes is begun: 60 ml of a 3% solution of polyvinyl alcohol with a molecular weight of 30,000 and 6 g of sodium dihydrogen phosphate made up to 1000 ml with water.

The reaction mixture is then stirred for a further 2 hours at 80° C. 100 g of isobutylene are passed through the reaction mixture during this time. Unreacted monomers remaining in the reaction mixture and volatile constituents are removed by stripping with steam. The bead polymer is isolated, washed and dried. 770 g of a styrene acrylonitrile copolymer with an acrylonitrile content of 20.2% (5.4% N), a styrene content of 79.7% and an isobutylene content of about 0.1% are obtained. The dimensional stability under heat determined according to Vicat is 107° to 108° C. The copolymer was dissolved in acetone/dimethylformamide and precipitated portionwise with petroleum ether. The intrinsic viscosities of the resulting five fractions in dimethylformamide at 25° C and their nitrogen contents were determined. The following results were obtained:

| Fraction No. | % by weight | | Acrylonitrile % by weight |
|---|---|---|---|
| 1 | 15.6 | 3.12 | 20.4 |
| 2 | 22.63 | 1.80 | 20.4 |
| 3 | 18.03 | 1.14 | 20.1 |
| 4 | 15.05 | 0.82 | 19.8 |

-continued

| Fraction No. | % by weight | | Acrylonitrile % by weight |
|---|---|---|---|
| 5 | 4.36 | 0.42 | 24.6 |

In spite of the quantities of styrene or acrylonitrile put into the process over and above the azeotropic proportions of styrene and acrylonitrile (see Houben-Weyl, Methoden der Organischen Chemie, Georg Thieme-Verlag, Stuttgart., 1961, Vol.XIV/2, page 841), a chemically extremely uniform copolymer is obtained whereas a suspension polymer prepared under the same conditions without using α-olefines as regulator was chemically much less uniform.

EXAMPLE 6

1998 g of styrene, 630 of acrylonitrile, 120 ml of a 10% solution of a dispersing agent (see Example 2) 150 ml of a 5% solution of polyvinyl alcohol (Molecular Weight 30,000), 4.97 g of benzoyl peroxide, 5000 ml of water, 1.2 g of sodium pyrosulphite and 18 g of sodium dihydrogen phosphate were introduced into a 12 L stirrer autoclave. The autoclave was evacuated and flushed with nitrogen. 2000 g of propylene were then forced in. The reaction mixture was heated to 85° C and stirred for 6 hours at 85° C. Processing of the reaction product yields 2240 g of a copolymer with an acrylonitrile content of 23%, a styrene content of 76.9% and a propylene content of 0.1%. The intrinsic viscosity of the copolymer determined in dimethylformamide at 25° C is η = 1.38. The dimensional stability of the copolymer under heat according to Vicat (DIN 53 460) is 109°–110° C.

EXAMPLE 7

A. Comparison Test 740 g of styrene, 300 g of acrylonitrile, 12000 ml of water, 315 g of Dresinate® 731 and 2.9 g of potassium peroxidisulphate are introduced into a 40 L stirrer autoclave under nitrogen. The autoclave is evacuated and flushed with nitrogen. The reaction mixture is heated to 80° C and stirred for 30 minutes at 80° C. Two solutions are then pumped in simultaneously over a period of 3 hours.

Solution 1: 80 g of Dresinate® 731 and 25.7 g of potassium peroxydisulphate made up to 1500 ml with water
Solution 2: 6660 g of styrene and 2567 g of acrylonitrile.

The reaction mixture was then stirred for one hour at 80° C. and coagulated with salt solution. 8500 g of a copolymer with an acrylonitrile content of 23% and an intrinsic viscosity of 2.22 in dimethylformamide at 25° C are obtained. The softening temperature according to Vicat is 104° C and the melt index determined at 240° under a load of 10 kp is 12 [g/10 min].

These products are difficult to process thermoplastically because of their poor flow characteristics.

B. Comparison test

A SAN copolymer prepared under similar conditions in the presence of 0.4% of dodecylmercaptan as regulator contains 26% of acrylonitrile and has an intrinsic viscosity of 0.89 in dimethylformamide at 25° C and a melt index at 240° C/10kp load of 172 (g/10 min). The Vicat softening temperature is 104° C.

C. A copolymer prepared under similar conditions in the presence of 1.9% of isobutylene contains 26% of acrylonitrile and has an intrinsic viscosity in dimethylformamide at 25° C of $[\eta] = 1.08$. The melt index at 240° C under a 10 kp load is 162 [g/10 min], and the Vicat softening temperature is 116° C.

We claim:

1. A copolymer of improved dimensional stability consisting essentially of
   a. 5 to 85% by weight of acrylonitrile or methacrylonitrile,
   b. 14.99 to 94.5% by weight of styrene and
   c. 0.01 to 0.5% by weight of an aliphatic monoolefin having 2 to 18 carbon atoms.

2. The copolymer of claim 1 wherein (c) is an aliphatic monoolefin having 2 to 4 carbon atoms.

3. The copolymer of claim 1 which contains from 10 to 40% by weight of acrylonitrile or methacrylonitrile and from 89.99 to 59.5% by weight of styrene.

* * * * *